US012632148B2

(12) United States Patent
Chen et al.

(10) Patent No.: US 12,632,148 B2
(45) Date of Patent: *May 19, 2026

(54) MITIGATING DISPLAY DIFFRACTION FLARES FOR UNDER-DISPLAY SENSING

(71) Applicant: Google LLC, Mountain View, CA (US)

(72) Inventors: Xi Chen, Mountain View, CA (US); Changgeng Liu, San Jose, CA (US); Ion Bita, Los Altos, CA (US); Marek Mienko, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/999,914

(22) Filed: Dec. 23, 2024

(65) Prior Publication Data

US 2025/0181195 A1 Jun. 5, 2025

Related U.S. Application Data

(63) Continuation of application No. 18/535,693, filed on Dec. 11, 2023, now Pat. No. 12,204,723.

(Continued)

(51) Int. Cl.
*G06F 3/042* (2006.01)
(52) U.S. Cl.
CPC .................................. *G06F 3/0421* (2013.01)
(58) Field of Classification Search
CPC ..... G06F 3/0421; G06F 3/0428; H04N 25/61; H04N 23/81
See application file for complete search history.

(56) References Cited

U.S. PATENT DOCUMENTS

| | | | | |
|---|---|---|---|---|
| 4,965,840 A | * | 10/1990 | Subbarao | G01C 3/085 |
| | | | | 396/307 |
| 5,043,570 A | * | 8/1991 | Takabayashi | G02B 21/002 |
| | | | | 359/368 |

(Continued)

FOREIGN PATENT DOCUMENTS

| | | |
|---|---|---|
| CN | 103488364 A | 1/2014 |
| CN | 117351895 A | 1/2024 |

(Continued)

OTHER PUBLICATIONS

Mienko, et al., ""Ultra-dark" OLED Panel Combining Polarization and Masking Layers", Technical Disclosure Commons, https://www.tdcommons.org/dpubs_series/7923, Mar. 18, 2025, 12 pages.

(Continued)

*Primary Examiner* — Amy Onyekaba
(74) *Attorney, Agent, or Firm* — Colby Nipper PLLC

(57) ABSTRACT

This document describes systems and techniques directed at mitigating display diffraction flares for under-display sensing. In aspects, an equation may be derived that models the effects of a display in producing a diffraction phenomenon at an image plane of a sensing region for an under-display light-sensing device. The equation may be used to determine an arrangement (e.g., an optimized arrangement) of components (e.g., sub-pixels) within the display that minimizes a diffraction efficiency for at least one diffraction order and, thereby, mitigates an intensity and/or a prevalence of optical artifacts in light-sensing data. In implementations, an image intensity point-spread-function is utilized to calculate diffraction efficiencies for respective diffraction orders (e.g., the lowest diffraction orders, the diffraction orders with the greatest brightness).

20 Claims, 11 Drawing Sheets

Related U.S. Application Data

(60) Provisional application No. 63/604,707, filed on Nov. 30, 2023.

(56) References Cited

U.S. PATENT DOCUMENTS

| | | | | |
|---|---|---|---|---|
| 6,088,059 | A * | 7/2000 | Mihara | H04N 1/58 |
| | | | | 348/241 |
| 6,196,691 | B1 * | 3/2001 | Ochiai | G02B 6/0046 |
| | | | | 362/558 |
| 6,452,635 | B1 * | 9/2002 | Tanaka | G06T 5/50 |
| | | | | 348/241 |
| 7,489,345 | B2 * | 2/2009 | Fukumoto | G06T 7/90 |
| | | | | 348/222.1 |
| 8,861,888 | B2 * | 10/2014 | Oyama | H04N 25/615 |
| | | | | 345/426 |
| 9,230,310 | B2 * | 1/2016 | Black | G06T 5/94 |
| 11,029,528 | B1 * | 6/2021 | D'Amico | G09G 5/38 |
| 11,889,033 | B2 * | 1/2024 | Zhao | H04N 23/741 |
| 12,204,723 | B2 | 1/2025 | Chen et al. | |
| 2006/0061592 | A1 * | 3/2006 | Akenine-Moller | G06T 15/005 |
| | | | | 345/428 |
| 2011/0175852 | A1 | 7/2011 | Goertz et al. | |
| 2012/0092769 | A1 * | 4/2012 | Nishiwaki | G02B 5/1876 |
| | | | | 359/570 |
| 2013/0120614 | A1 * | 5/2013 | Oyama | G06T 5/73 |
| | | | | 348/234 |
| 2018/0137332 | A1 | 5/2018 | Andersen et al. | |
| 2018/0260602 | A1 | 9/2018 | He et al. | |
| 2018/0330147 | A1 | 11/2018 | Kim et al. | |
| 2019/0026535 | A1 | 1/2019 | Li et al. | |
| 2020/0029035 | A1 * | 1/2020 | Agranov | H04N 9/646 |
| 2020/0403186 | A1 | 12/2020 | Choi et al. | |
| 2021/0029336 | A1 * | 1/2021 | Liu | H04N 23/84 |
| 2021/0326566 | A1 * | 10/2021 | Chen | G06V 40/1318 |
| 2021/0351253 | A1 * | 11/2021 | Yuan | H10K 59/122 |
| 2022/0149120 | A1 | 5/2022 | Zhao et al. | |
| 2022/0318971 | A1 * | 10/2022 | Choi | G06T 5/50 |
| 2022/0391086 | A1 | 12/2022 | Westerman | |
| 2022/0392963 | A1 * | 12/2022 | Chen | G09G 3/20 |
| 2023/0057334 | A1 * | 2/2023 | Yang | H10K 59/38 |
| 2023/0064097 | A1 * | 3/2023 | Song | G02B 5/1876 |
| 2023/0121758 | A1 * | 4/2023 | Kim | H04N 23/55 |
| | | | | 348/222.1 |
| 2023/0137831 | A1 * | 5/2023 | Do | H04N 23/71 |
| | | | | 348/241 |
| 2023/0230204 | A1 * | 7/2023 | Xu | G06T 5/60 |
| | | | | 348/222.1 |
| 2023/0306912 | A1 | 9/2023 | Wen et al. | |
| 2023/0363228 | A1 * | 11/2023 | Jia | H10K 59/351 |
| 2023/0370735 | A1 * | 11/2023 | Zhao | H04N 23/81 |
| 2024/0105142 | A1 | 3/2024 | Jeon et al. | |
| 2024/0161548 | A1 | 5/2024 | Kim et al. | |
| 2024/0193985 | A1 | 6/2024 | Sammoura et al. | |
| 2024/0264740 | A1 | 8/2024 | Zou et al. | |
| 2024/0298509 | A1 | 9/2024 | Gong et al. | |

FOREIGN PATENT DOCUMENTS

| | | |
|---|---|---|
| EP | 1993062 | 11/2008 |
| TW | 202318385 A | 5/2023 |
| WO | 2009067109 | 5/2009 |
| WO | 2015188595 A1 | 12/2015 |
| WO | 2020192051 A1 | 10/2020 |
| WO | 2022241786 | 11/2022 |

OTHER PUBLICATIONS

"Notice of Allowance", U.S. Appl. No. 18/535,693, filed Sep. 9, 2024, 9 pages.

Bai, et al., "On-Pixel Ratio-Based Adjustment of Local High Brightness Control", Oct. 8, 2024, 13 pages.

Choi, et al., "Light-Guiding Structure for Under-Display Sensor Modules", Technical Disclosure Commons; https://www.tdcommons.org/dpubs_series/3527, Aug. 17, 2020, 8 pages.

Eltoft, et al., "Adaptive Maximum Fingerprint Touch-Size Threshold for Reduced Unintended Authentication Attempts and Reduced Spoof Accept Rate", Technical Disclosure Commons, https://www.tdcommons.org/dpubs_series/7586, Nov. 22, 2024, 12 pages.

Lee, et al., "Under Display Camera Image Recovery through Diffraction Compensation", Jan. 2021, 5 pages.

Lim, et al., "Under-Display Fingerprint Sensor System", Technical Disclosure Commons, https://www.tdcommons.org/dpubs_series/3309, Jun. 10, 2020, 11 pages.

Sammoura, et al., "Latent Fingerprint Detection Using Rotationally-Invariant Vectors", Technical Disclosure Commons; https://www.tdcommons.org/dpubs_series/3241, May 19, 2020, 12 pages.

Yang, et al., "Designing Display Pixel Layouts for Under-panel Cameras", Apr. 27, 2021, 12 pages.

* cited by examiner 100-1

| Computing Device |
| 104 |
| Display |
| 106 |
| Under-Display |
| Light-Sensing Device |
| 108 |

102

106

112-1

110-1

106

112-2

110-2

100-2

108

122

124

120

106

118

116

114

602-1

602-2

| Diffraction Orders | (1,0) | (1,1) | (2,0) | (2,1) | (2,2) |
|---|---|---|---|---|---|
| Diffraction Efficiencies | 0.044% | 0.14% | 1.595% | 0.0097% | 0.91% |

702-1

| Diffraction Orders | (1,0) | (1,1) | (2,0) | (2,1) | (2,2) |
|---|---|---|---|---|---|
| Diffraction Efficiencies | 0.2% | 0.89% | 0.0082% | 0.29% | 0.0047% |

702-2

800-1

| Diffraction Orders | (1,0) | (1,1) | (2,0) | (2,1) | (2,2) |
|---|---|---|---|---|---|
| Diffraction Efficiencies | 0.069% | 0.4% | 3.5% | 0.01% | 1.2% |

802-1

800-2

| Diffraction Orders | (1,0) | (1,1) | (2,0) | (2,1) | (2,2) |
|---|---|---|---|---|---|
| Diffraction Efficiencies | 0.04% | 0.3% | 2.0% | 0.002% | 1.1% |

802-2

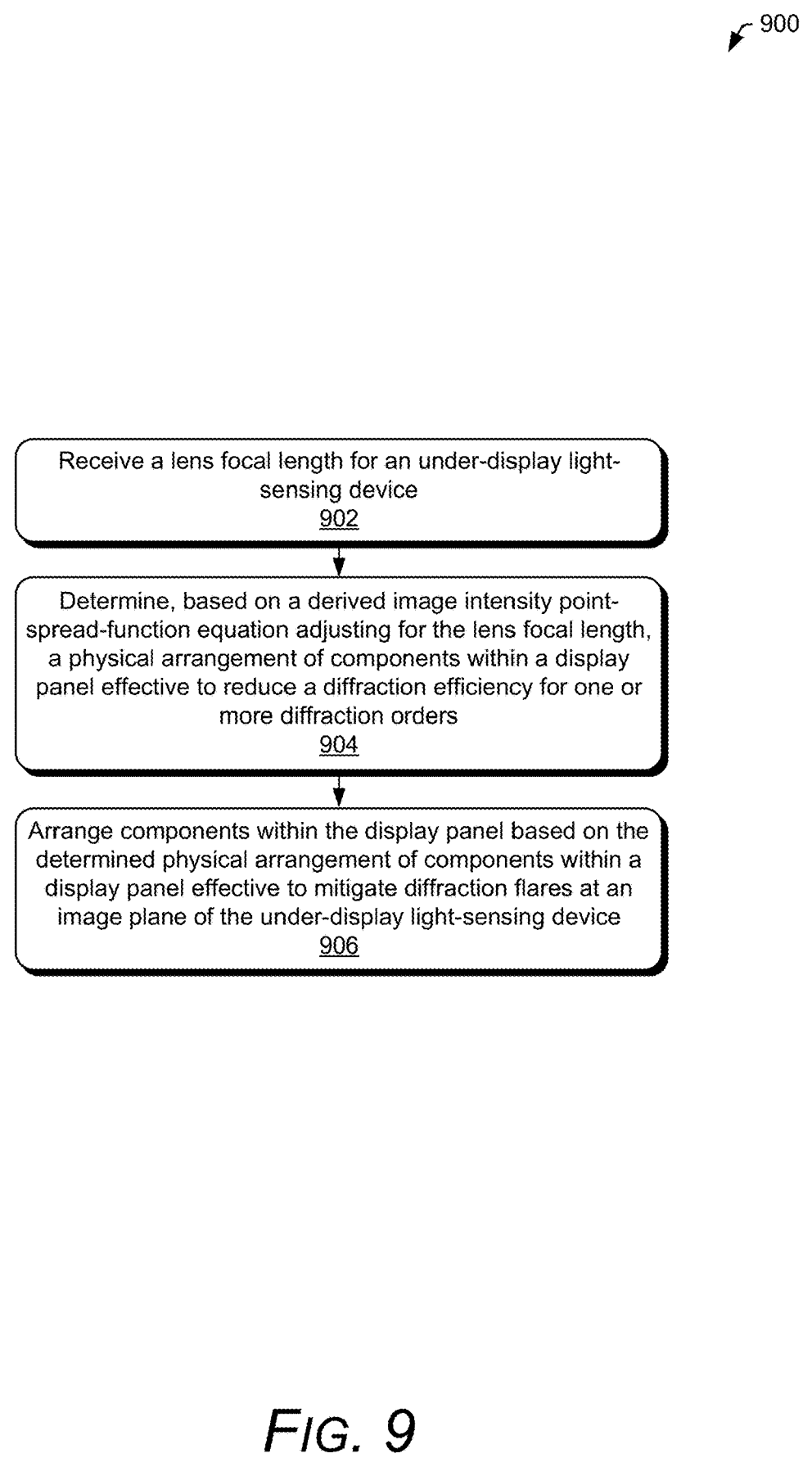

900

Receive a lens focal length for an under-display light-sensing device
902

Determine, based on a derived image intensity point-spread-function equation adjusting for the lens focal length, a physical arrangement of components within a display panel effective to reduce a diffraction efficiency for one or more diffraction orders
904

Arrange components within the display panel based on the determined physical arrangement of components within a display panel effective to mitigate diffraction flares at an image plane of the under-display light-sensing device
906

*FIG. 9*

MITIGATING DISPLAY DIFFRACTION FLARES FOR UNDER-DISPLAY SENSING

CROSS-REFERENCE TO RELATED APPLICATION(S)

This application is a continuation of and claims priority to U.S. Non-Provisional patent application Ser. No. 18/535,693, filed on Dec. 11, 2023, which in turn claims the benefit of U.S. Provisional Patent Application Ser. No. 63/604,707 filed on Nov. 30, 2023, the disclosures of which are incorporated by reference herein in their entireties.

SUMMARY

This document describes systems and techniques directed at display pattern optimization for under-display sensing. In aspects, an equation may be derived that models the effects of a display in producing a diffraction phenomenon at an image plane of a sensing region for an under-display light-sensing device. The equation may be used to determine an arrangement (e.g., an optimized arrangement) of components (e.g., sub-pixels) within the display that minimizes a diffraction efficiency for at least one diffraction order and, thereby, mitigates an intensity and/or a prevalence of optical artifacts in light-sensing data. In implementations, an image intensity point-spread-function is utilized to calculate diffraction efficiencies for respective diffraction orders (e.g., the lowest diffraction orders, the diffraction orders with the greatest brightness).

In one example, a method is disclosed herein that describes receiving a lens focal length for an under-display light-sensing and determining, based on a derived image intensity point-spread-function equation adjusted for the received lens focal length, a physical arrangement of components within a display panel to reduce a diffraction efficiency for one or more diffraction orders. Further, the method describes arranging components within the display based on the determined physical arrangement to mitigate diffraction flares (e.g., a diffraction phenomenon) at an image plane of the under-display light-sensing device.

This Summary is provided to introduce simplified concepts for systems and techniques directed at display pattern optimization for under-display sensing, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at display pattern optimization for under-display sensing are described in this document with reference to the following drawings:

FIG. 1-2 illustrates an example scenario in which the display influences ambient light before irradiating a sensing region of the under-display light-sensing device;

FIG. 1-3 illustrates an example implementation of a display and an arrangement of components therein;

FIG. 2 illustrates an example implementation of a display with an optimized display panel sub-pixel pattern to mitigate optical artifacts in sensor data;

FIG. 3 illustrates an example implementation of example computing devices which are capable of implementing an optimized display for under-display sensing;

FIG. 9 illustrates an example method directed at mitigating display diffraction flares for under-display sensing in accordance with one or more implementations.

The same numbers are used throughout the Drawings to reference like features and components.

DETAILED DESCRIPTION

Overview

Figure 1:
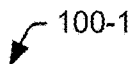
FIG. 1-1 illustrates an example environment in which a user utilizes a computing device with a display and an under-display light-sensing device to perform one or more operations.

Many computing devices (e.g., wireless-network devices, desktops, smartwatches) include an electronic visual display, often simply referred to as a display or screen, integrated as a portion of the computing device's housing. Computing device manufacturers fabricate these displays in a layered structure ("display panel stack"), containing a cover layer (e.g., cover glass) and a display module having a display panel.

Display panels increasingly rely on organic light-emitting diode (OLED) technology, which include tens of thousands of pixel circuits arranged in a two-dimensional array (e.g., circular array, rectangular array). Each pixel circuit may include one or more sub-pixels, which, in isolation or combination, can illuminate to produce colored light ("pixel"). Through activation of the one or more sub-pixels in these pixel circuits, computing devices can cause a display panel to illuminate at various intensities and colors, effective to produce on-screen content (e.g., images). And, by exploiting a feature of the human eye and brain referred to as persistence of vision (e.g., retinal persistence), a display panel can redraw on-screen content at predetermined frequencies ("refresh rate"), giving the illusion of persistent on-screen content. For example, a display panel configured to operate at a refresh rate of 120 hertz (Hz) can redraw on-screen content 120 times per second. Moreover, by redrawing on-screen content, the display panel can change on-screen content seamlessly (e.g., scrolling) and give an illusion of on-screen content as images in motion (e.g., video). The benefits of OLED displays include high refresh rates, small display response times, and low power consumption. These benefits make OLED displays well-suited for computing devices, and are further appreciated by users, in large part, because of their image quality.

Further, computing devices with OLED displays can include one or more under-display sensors, such as biometric recognition systems, image sensors, or ambient light sensors. For example, some computing devices include one or more biometric recognition systems disposed underneath, or within, the display panel stack. Positioning sensors underneath a display allows for a high screen-to-body ratio and, further, preserves space on a display side of a computing device. For example, an under-display fingerprint sensor can be disposed beneath the cover layer and one or more layers (e.g., all layers, one layer) of the display module. An under-display fingerprint sensor may enable users to provide user input (e.g., a finger having a fingerprint, a fingertip touch input) at a display to authenticate themselves to one or more applications or an operating system implemented on the computing device. In another example, an image sensor can be disposed beneath the cover layer and one or more layers of the display module. The image sensor disposed underneath at least portions of display may facilitate facial recognition services.

In some instances, a display panel, including pixel circuits, routing layers, or sub-pixels, can alter a wavelength or frequency of light and influence under-display sensor data. In still further cases, a display panel may cause light to diffract (e.g., amplitude type diffraction grating), producing optical artifacts (e.g., flare effect, over-saturation, blurring) in under-display sensor data. For example, a display panel may include a periodic pattern of sub-pixels that causes diffraction patterns at a sensing region of an under-display sensor. In more detail, an arrangement, size, shape, and/or orientation of sub-pixels within a display panel may influence a transmission of light from an environment external to a computing device to the one or more under-display sensors.

For instance, under bright ambient lighting conditions, an under-display image sensor may encounter a strong periodic flare pattern at an associated sensing region (e.g., image plane). The flare pattern may be the result of components (and an arrangement thereof) within the display panel, such as a periodic sub-pixel pattern. The flare pattern may correspond to diffraction orders (e.g., specific angular directions in which diffracted light propagates) due to the arrangement of components within the display panel. The flare pattern may introduce optical artifacts in the under-display sensor data, degrading a resolution and/or a sharpness and saturating image data.

FIG. 1-1 illustrates an example environment 100-1 in which a user 102 utilizes a computing device 104 with a display 106 and an under-display light-sensing device 108 to perform one or more operations. As illustrated in FIG. 1-1, for example only, the one or more operations include an authentication routine 110. In implementations, the under-display light-sensing device 108 is positioned beneath a cover layer and a display panel of the display 106. The under-display light-sensing device 108 may support the one or more operations, including capturing images to facilitate the authentication routine 110, for instance. In one example, the under-display light-sensing device 108 can capture images of a face of a user 102 and transmit the images to one or more processors. If the face of the user 102 is authenticated, then the one or more processors may transition the computing device 104 from a locked state 112-1 to an unlocked state 112-2.

In some situations, however, ambient light (e.g., light radiating from an environment external to the computing device 104) may be manipulated or otherwise influenced by the display 106 (e.g., a cover layer, a display panel) before irradiating a sensing region of the under-display light-sensing device 108. As a consequence, the one or more operations may be delayed, stymied, or produce unexpected results. In one example, the under-display light-sensing device 108 is an image-capturing device and the one or more operations include facial recognition for authentication. Before irradiating a sensing region of the image-capturing device, ambient light is diffracted when radiating through the display 106. As a result, the sensing region collects sensor data with optical artifacts (e.g., flare effects, over-saturation, blurring). These optical artifacts can delay facial recognition and cause a poor user experience.

Figures 1, 2:
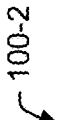

FIG. 1-2 illustrates an example scenario 100-2 in which the display 106 influences ambient light before irradiating a sensing region of the under-display light-sensing device 108. As illustrated, ambient light 114 may radiate through a cover layer 116 and a display module 118. In implementations, the display module 118 may include a display panel (not labelled) having pixel circuits, sub-pixels, routing circuitry, and/or similar components. As the ambient light 114 travels through the display 106, it may be diffracted 120 and produce a diffraction pattern 122 on a sensing region 124 of the under-display light-sensing device 108. This diffraction pattern 122 may produce optical artifacts in the under-display sensor data, including a flare effect.

Figures 1, 2, 3:
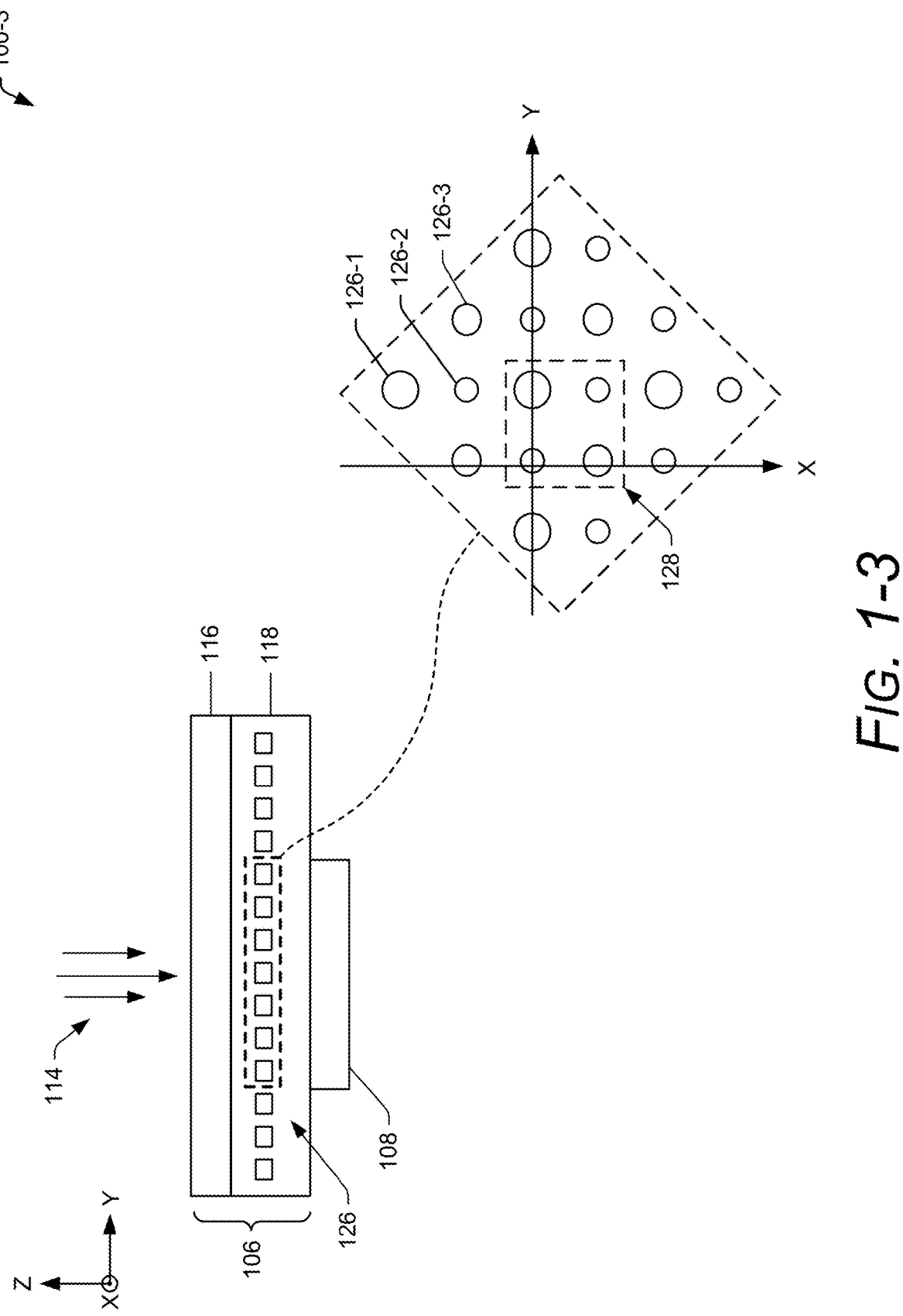
Figure 2:
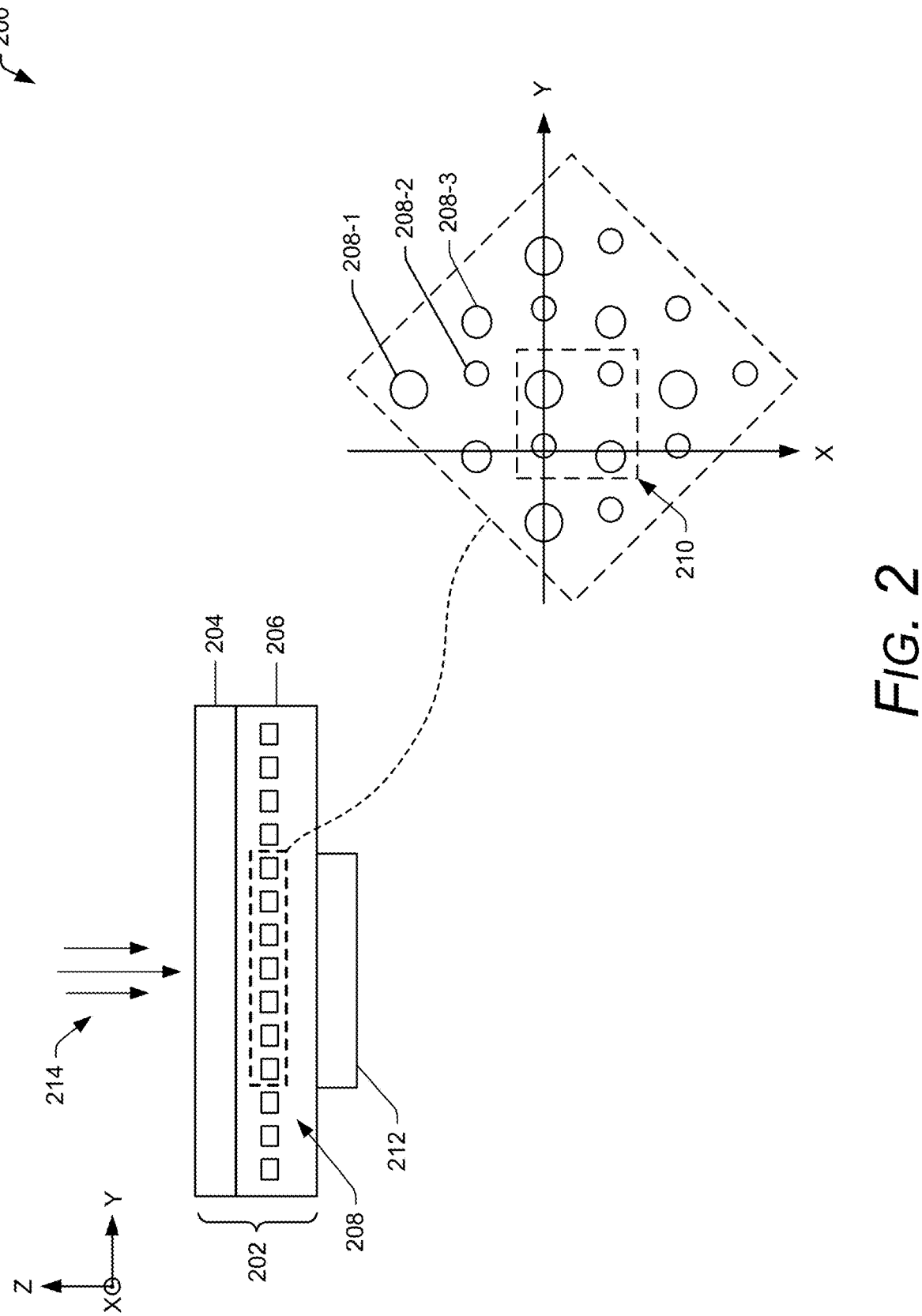
Figure 3:
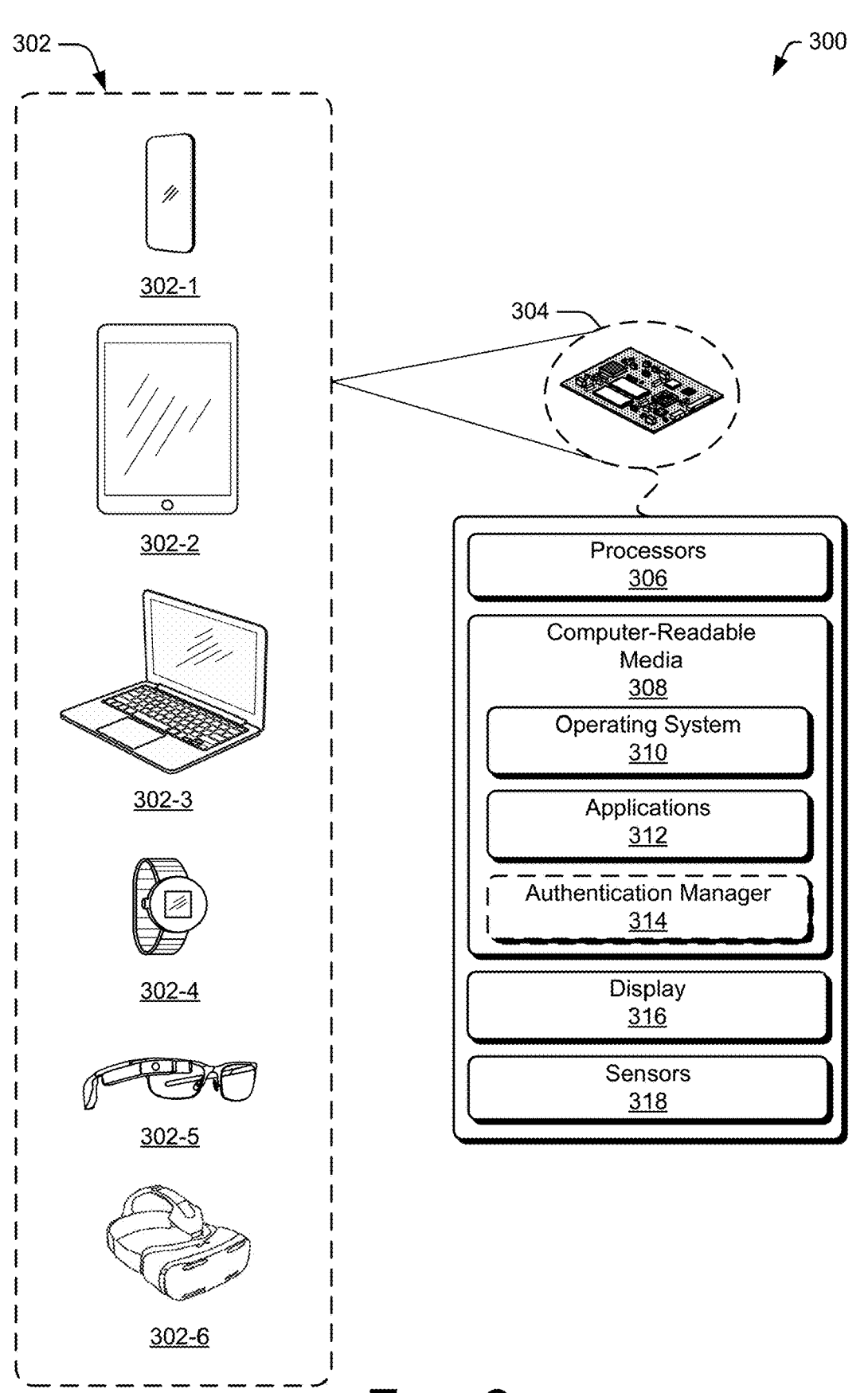

FIG. 1-3 illustrates an example implementation 100-3 of a display 106 and an arrangement of components therein. As illustrated, the display 106 includes the cover layer 116 and the display module 118. The display module 118 includes a display panel having sub-pixels 126 (e.g., sub-pixel 126-1, sub-pixel 126-2, sub-pixel 126-3). In at least some implementations, the sub-pixels 126 are at least partially arranged in a periodic pattern (e.g., a display panel's pitch 128 is one unit of periodic structure). For example, sub-pixels 126 in the display panel may be deposited in a periodic pattern with semi-equal spacing between one another. A periodic pattern of semi-equally spaced sub-pixels 126 can, in some instances, amplify optical artifacts, especially at particular angles of radiation and wavelengths of light.

To this end, this document describes systems and techniques directed at display pattern optimization for under-display sensing. In aspects, an equation may be derived that models the effects of a display in producing a diffraction phenomenon at an image plane of a sensing region for an under-display light-sensing device. The equation may be used to determine an arrangement (e.g., an optimized arrangement) of components (e.g., sub-pixels) within the display that minimizes a diffraction efficiency for at least one diffraction order and, thereby, mitigates an intensity and/or a prevalence of optical artifacts in light-sensing data. In implementations, an image intensity point-spread-function is utilized to calculate diffraction efficiencies for respective diffraction orders (e.g., the lowest diffraction orders, the diffraction orders with the greatest brightness).

FIG. 2 illustrates an example implementation 200 of a display 202 with an optimized display panel sub-pixel pattern to mitigate optical artifacts in sensor data. As illustrated, the display 202 includes a cover layer 204 and a display module 206 having a display panel (not labelled) with pixel circuits (not illustrated), sub-pixels 208 (e.g., sub-pixel 208-1, sub-pixel 208-2, sub-pixel 208-3), routing circuitry (not illustrated), and/or similar components. In at least some implementations, as illustrated in FIG. 2, the sub-pixels 208 are at least partially arranged in a periodic pattern based on the display panel's pitch 210. The arrangement of sub-pixels 208 may be organized (e.g., spaced apart) in such a fashion to reduce, for example, an efficiency of one or more diffraction orders. In this way, a sensing region of an under-display light-sensing device 212 can receive ambient light 214 with decreased optical artifacts (e.g., decreased intensity of optical artifacts, decreased frequency of optical artifacts in sensor data). Thus, the term optimized, as described herein, should be understood as referring to one or more physical components associated with a display (e.g., display 202) arranged in such a fashion to improve light sensing (e.g., by reducing an intensity or prevalence of optical artifacts) by an under-display light-sensing device.

Operating Environment

FIG. 3 illustrates an example implementation 300 of example computing devices 302 which are capable of implementing an optimized display for under-display sensing. The computing devices 302 are illustrated as a variety of example devices, including consumer computing devices. As non-limiting examples, the computing device 302 can be a mobile phone 302-1, a tablet device 302-2, a laptop computer 302-3, a computerized watch 302-4, smart glasses 302-5, virtual-reality (VR) goggles 302-6, and the like. Note that the computing device 302 can be wearable, non-wearable but mobile, or relatively immobile (e.g., desktops, appliances). The computing device 302 may include additional components and interfaces omitted from FIG. 3 for the sake of clarity.

As illustrated, the computing device 302 includes a printed circuit board assembly 304 (PCBA 304) on which components and interconnects of the computing device 302 may be embodied. In implementations, the PCBA 304 may include multiple printed circuit boards operably coupled together via, for example, electrical wiring. Alternatively or additionally, components of the computing device 302 can be embodied on other substrates, such as flexible circuit material or other insulative material. Generally, electrical components and electromechanical components of the computing device 302 are assembled onto a printed circuit board (PCB) to form the PCBA 304. Various components of the PCBA 304 (e.g., processors and memories) are then programmed and tested to verify the correct function of the PCBA 304. The PCBA 304 is connected to or assembled with other parts of the computing device 302 into a housing.

The PCBA 304 includes one or more processors 306 and computer-readable media 308. The processor(s) 306 may include any suitable single-core or multi-core processor. The processor(s) 306 may be configured to execute instructions or commands stored within computer-readable media 308 including an operating system 310, applications 312, and, optionally, an authentication manager 314. For example, the processor(s) 306 may perform specific computational tasks of the operating system 310 directed at controlling the creation and display of on-screen content on a display. The computer-readable media 308 may include one or more non-transitory storage devices such as a random-access memory (RAM), hard drive, solid-state drive (SSD), or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate and/or interact with each other.

The computing device 302 further includes a display 316. Although an OLED display is described herein, it is provided as an example only. For, the computing device 302 may include or utilize any of a variety of displays, including an active-matrix OLED (AMOLED) display, an electroluminescent display (ELD), a microLED display, a liquid crystal display (LCD), a thin film transistor (TFT) LCD, an in-place switching (IPS) LCD, and so forth. The display 316 may also be referred to as a screen, such that content may be displayed on-screen.

The PCBA 304 may further include one or more sensors 328 disposed anywhere on or in the computing device 302, including underneath at least portions of the display 316. The sensors can include any of a variety of sensors, such as an audio sensor (e.g., a microphone), a touch-input sensor (e.g., a touchscreen), an image-capture device (e.g., a camera, video-camera), proximity sensors (e.g., capacitive sensors), an ambient light sensor (e.g., photodetector), and/or an under-display fingerprint sensor (UDFPS). The UDFPS can be implemented as an optical UDFPS or as an ultrasonic UDFPS. The UDFPS can be disposed within a housing of the computing device 302, embedded underneath the display 316. In implementations, the PCBA 304 can include more than one UDFPS. Additionally, the one or more sensors 328 that collect, sense, or measure light may capture light of varying electromagnetic frequencies, including infrared light, visible light, and so on.

Figure 4:
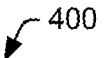
FIG. 4 illustrates an example implementation of the display from FIG. 2 in more detail.
Figure 4:
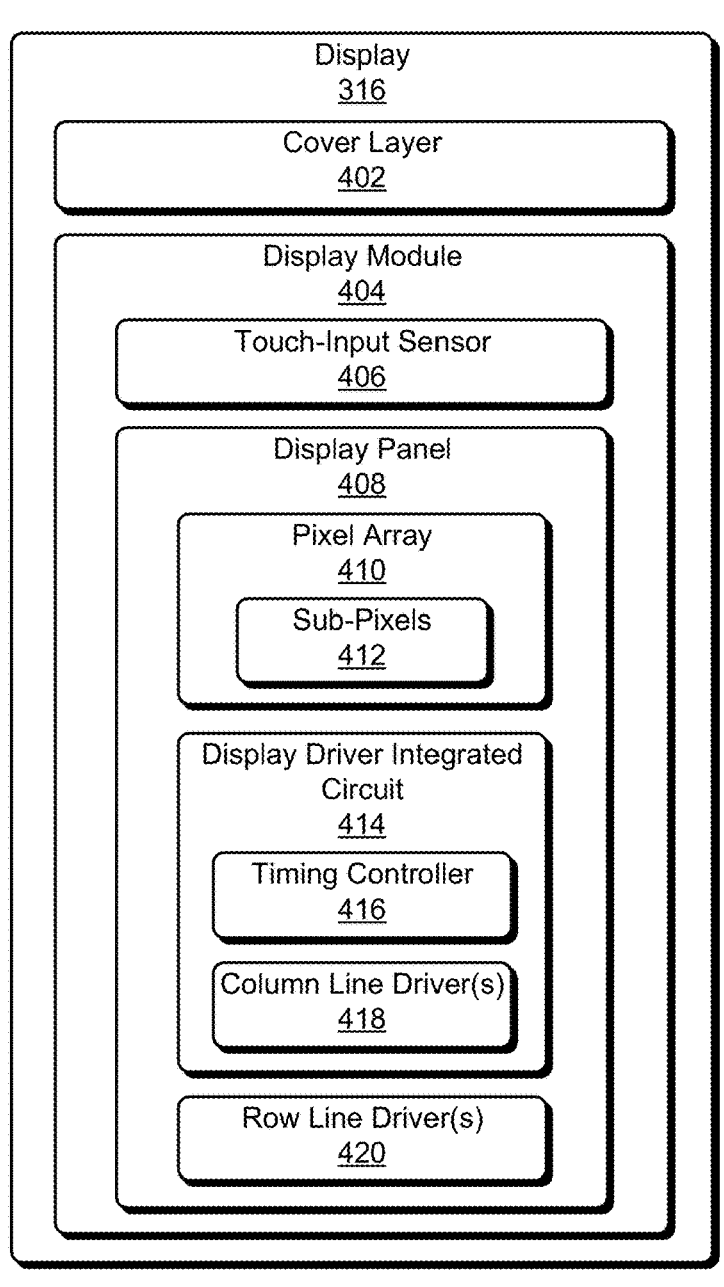

As illustrated in FIG. 4, the display 316 may include a cover layer 402 and a display module 404. The cover layer 402 may be composed of any of a variety of transparent materials including polymers (e.g., plastic, acrylic), glass (e.g., tempered glass), and so forth, forming any three-dimensional shape (e.g., polyhedron), such as a rectangular prism or cylinder. During manufacturing, a bottom face of the cover layer 402 may be bonded (e.g., glued) to the display module 404 to protect the display module 404 and serve as a barrier to ingress contaminants (e.g., dust, water).

The display module 404 may include a touch-input sensor 406 (e.g., one or more sensors 328) and a display panel 408. The display panel 408 may include a pixel array 410 of thousands (or millions) of pixel circuits (e.g., low-temperature polycrystalline oxide (LTPO) pixel circuits), forming any two-dimensional grid (e.g., rectangular grid, circular grid, curved grid). Each pixel circuit may include one or more sub-pixels 412 (e.g., light-emitting components), such as red, green, blue, and/or infrared sub-pixels.

The display panel 408 may further include a display driver integrated circuit 414 (DDIC 414). The DDIC 414 may include a timing controller 416 and column line driver(s) 418. The column line driver 418 may include, as a non-limiting example, a data-line driver. The display panel 408 may further include row line drivers 420. The row line drivers 420 may include, as non-limiting examples, gate-line drivers, scan-line drivers, and/or emission-control drivers.

The timing controller 416 provides interfacing functionality between the processor(s) 306 and the drivers (e.g., column line driver(s) 418, row line driver(s) 420) of the display 316. The timing controller 416 generally accepts commands and data from the processor(s) 306, generates signals with appropriate voltage, current, timing, and demultiplexing, and transmits the signals to the drivers to enable the display 316 to present a desired image.

The drivers may transmit time-variant and amplitude-variant signals (e.g., voltage signals, current signals) to control the pixel array 410. For example, a data-line driver transmits signals containing voltage data to the pixel array 410 to control the luminance of the one or more sub-pixels 412. A scan-line driver transmits a signal to enable or disable an organic light-emitting diode to receive the data voltage from the data-line driver. An emission-control driver supplies an emission-control signal to the pixel array 410. For example, the emission-control driver can supply, in an alternating fashion, a low emission-control signal and a high emission-control signal to each of the pixel circuits. In implementations, the low emission-control signal is configured to enable an illumination of one or more pixel circuits in accordance with received voltage data and the high emission-control signal configured to disable the illumination of one or more pixel circuits. Together, the drivers control the pixel array 410 to generate light to create an image on the display 316.

The display 316 may further include, often integrated within the display module 404, but sometimes altogether separate of the display module 404, a collimator, one or more polarizer layers (e.g., polarization filters), one or more adhesive layers (e.g., glue), and a protective layer (e.g., an EMBO layer). The protective layer may include one or more layers, such as a polymer layer (e.g., polyethylene terephthalate (PET) substrate), a metallic layer (e.g., copper layer, stainless steel layer), a foam pad, and an adhesive layer. The protective layer may be on the bottom of the display panel stack (e.g., opposite the cover layer 402), providing protection from, for example, moisture, debris, and/or radiation (e.g., electromagnetic radiation, heat radiation).

Figure 5:
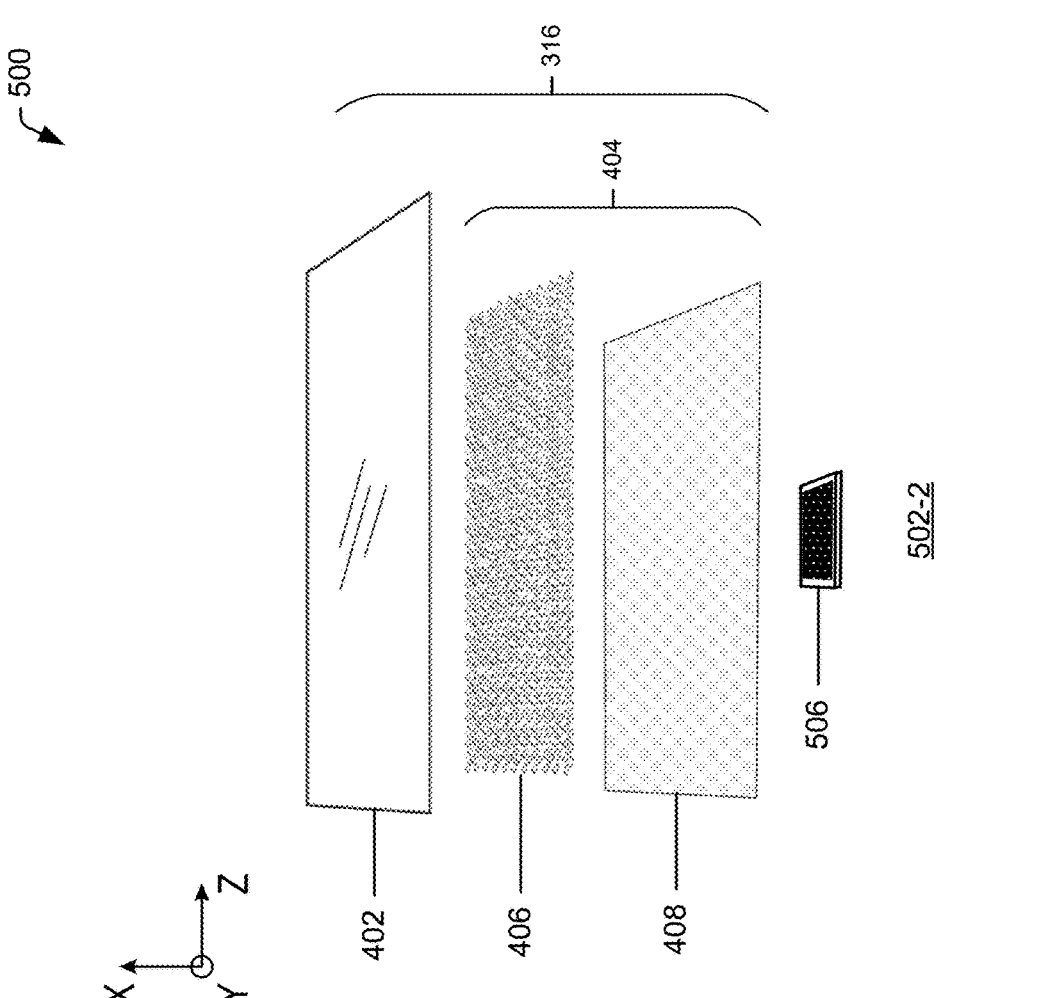
FIG. 5 illustrates an example implementation of an example computing device having a display manufactured as a display panel stack.
Figure 5:
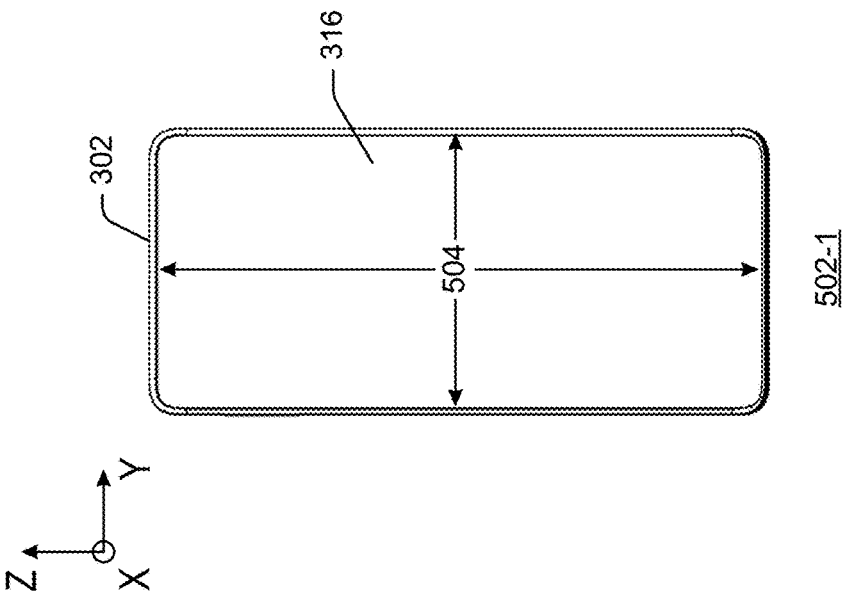

FIG. 5 illustrates an example implementation 500 of the example computing device 302 (e.g., mobile phone 302-1) having the display 316 manufactured as a display panel stack. As illustrated in a first detail view 502-1, the computing device 302 includes at least one layer of the display 316 (e.g., the cover layer 402) integrated as one or more portions of a housing of the computing device 302. The display 316 includes an active area 504 that may be visible and/or accessible to touch by users.

A second detail view 502-2 illustrates an exploded view of the display 316. For clarity, some components of the display 316 may be omitted. As illustrated, the display 316 includes the cover layer 402 disposed as a top layer and the display module 404, which in this example implementation includes the touch-input sensor 406, disposed thereunder. The touch-input sensor 406 is disposed beneath the cover layer 402 and above the display panel 408.

In such a configuration, light emitting from the display panel 408 can pass through the touch-input sensor 406 and the cover layer 402 for viewing by users within the active area 504. Further, users can provide user input on or above the cover layer 402 (e.g., within the active area 504) for receipt by one or more sensors, including the touch-input sensor 406. For example, users can provide user input on the cover layer 402, within the active area 504, for receipt (e.g., detection) by the touch-input sensor 406.

As described herein, user input may include any physical or behavioral characteristics provided (directly or indirectly) by a user. In at least some implementations, biometric identifiers (e.g., biological characteristics) may be derived from the user input. As non-limiting examples, biometric identifiers can include fingerprints, irises, palms, voice, facial structure, and so forth.

Detail view 502-2 further illustrates an under-display sensor 506 (e.g., one or more sensors 318) disposed underneath the display panel 408, including the sub-pixels 412 (not illustrated). In implementations, the under-display sensor 506 may be a light sensing device, such as an image capture device, an ambient light sensing device, or the like. In such a configuration, ambient light (e.g., light radiating from an environment external to the computing device 302) may radiate through the cover layer 402, the touch-input sensor 406, and the display panel 408 before irradiating a sensing region of the under-display sensor 506.

Figure 6:
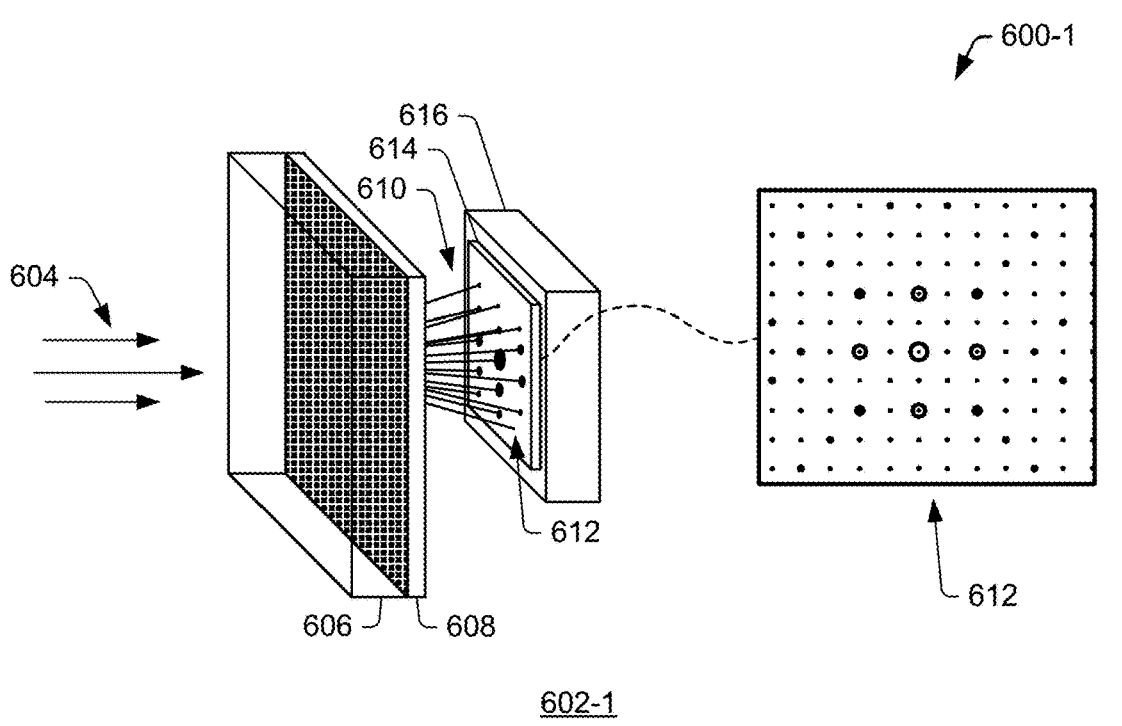
FIG. 6 illustrates a first example implementation of a display with an unoptimized display panel sub-pixel pattern and a second example implementation of a display with an optimized display panel sub-pixel pattern in a first detail view and a second detail view, respectively.
Figure 6:
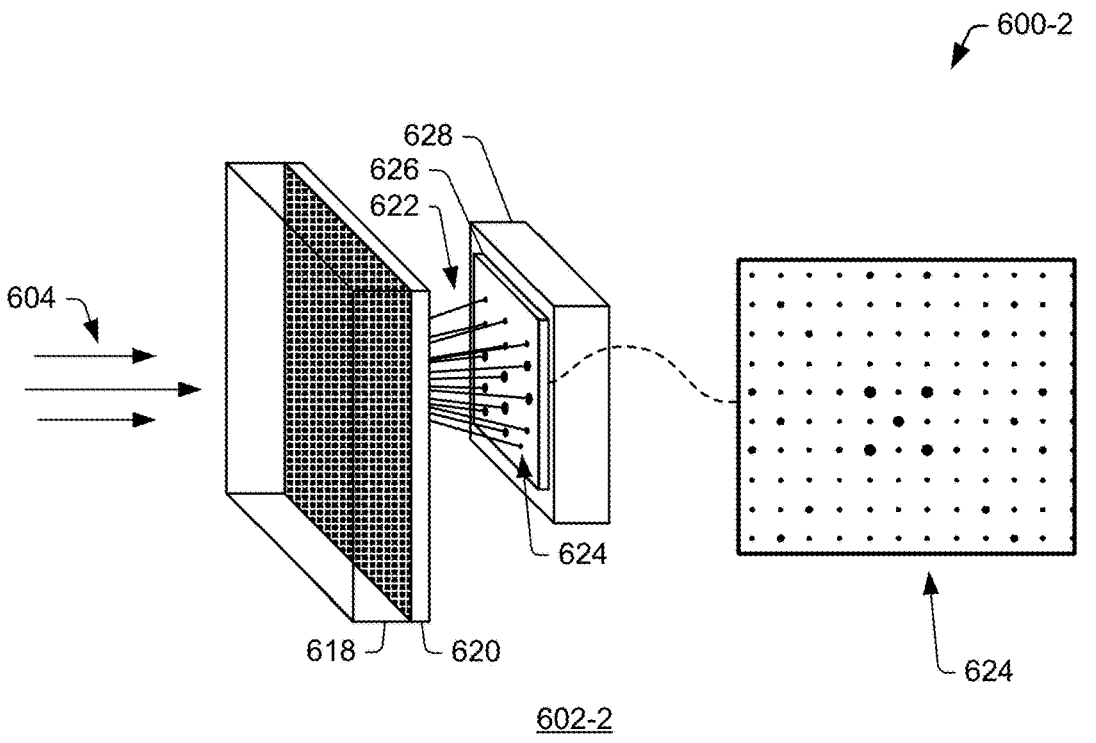

FIG. 6 illustrates a first example implementation 600-1 of a display with an unoptimized display panel sub-pixel pattern and a second example implementation 600-2 of a display with an optimized display panel sub-pixel pattern in a first detail view 602-1 and a second detail view 602-2, respectively. As illustrated, in the first detail view 602-1, ambient light 604 may radiate through a cover layer 606 and a display module 608. The display module 608 may include an unoptimized display panel, resulting in a diffraction 610 of the ambient light 604 that produces a diffraction pattern 612 on a sensing region 614 of an under-display sensor 616. For example, due to the sub-pixels within the unoptimized display panel functioning like a diffraction grating, the ambient light 604 constructively and destructively interferes to create different diffraction orders, producing a diffraction pattern 612 on the sensing region 614. Due to electromagnetic waves constructively interfering to produce comparatively more-intense bright spots at particular diffraction orders, the diffraction pattern 612 caused by the unoptimized display panel may introduce optical artifacts, such as image flares, blurring, over-saturation, and so forth, in the sensing data.

As illustrated, in the second detail view 602-2, ambient light 604 may radiate through a cover layer 618 and a display module 620. The display module 620 may include an optimized display panel with a particular arrangement of sub-pixels. Ambient light 604 that radiates through the optimized display panel may diffract 622 and still produce a diffraction pattern 624 on a sensing region 626 of an under-display sensor 628. In comparison to the unoptimized display panel, however, sub-pixels within the optimized display panel may be arranged in such a fashion to minimize an effect of the constructive interference of electromagnetic waves for one or more diffraction orders and, thereby, reduce optical artifacts in sensing data.

In aspects, an equation may be derived that models the effects of a display in producing a diffraction phenomenon at an image plane of a sensing region for an under-display light-sensing device. The equation may be used to determine an arrangement (e.g., an optimized arrangement) of components (e.g., sub-pixels) within the display that minimizes a diffraction efficiency for at least one diffraction order and, thereby, mitigates an intensity and/or a prevalence of optical artifacts in light-sensing data. In implementations, an image intensity point-spread-function is utilized to calculate diffraction efficiencies for respective diffraction orders (e.g., the lowest diffraction orders, the diffraction orders with the greatest brightness).

Mathematically, the image intensity point-spread-function may be expressed using Equation 1:

$$I(x_i, y_i) \simeq |h_L(x_i, y_i)|^2 + \frac{1}{(1 - F_1 - F_2 - \cdots)^2} * \qquad \text{Equation 1}$$

$$\sum_{m \neq 0}\sum_{n \neq 0}\left| \frac{\sqrt{\frac{F_1}{\pi}} J_1\left(2\sqrt{\pi F_1(m^2 + n^2)}\right) + \sqrt{\frac{F_2}{\pi}} J_1\left(2\sqrt{\pi F_2(m^2 + n^2)}\right)e^{-j\frac{2\pi}{\Lambda}(mX_2 + nY_2)} + \cdots}{\sqrt{m^2 + n^2}} \right| *$$

$$\left| h_L\left(x_i - \frac{m\lambda(EFL)}{\Lambda}, y_i - \frac{n\lambda(EFL)}{\Lambda}\right) \right|^2$$

where h represents an intensity profile at a specific point within the image intensity point-spread-function (e.g., how an intensity of light varies as one moves away from a center of the point-spread-function), x and y are an image point's coordinate, $F_1$, $F_2$, . . . $F_i$ are sub-pixel fill factors defined as $$\frac{sub-pixel\ emissive\ area}{sub-pixel\ area},$$

m and n are diffraction orders, $J_1(x,y)$ is a first kind Bessel function, $\Lambda$ is a display panel pitch size (e.g., one unit of periodic structure), $\lambda$ is a wavelength of light, EFL is a light-sensing device's lens focal length, sinc(x) is defined as $$\frac{\sin(\pi x)}{\pi x},$$

and $X_i$ and $Y_i$ may denote the spatial coordinates in a multi-dimensional point-spread-function. In at least some implementations, sub-pixels may be assumed to be circular and, thus, $F_i$ may be given as $$\frac{\pi R_i^2}{\Lambda^2},$$

where R is a radius of a sub-pixel.

In implementations, as demonstrated by Equation 1, diffraction efficiencies of non-zero diffraction orders may be independent of a display panel's pitch. Instead, diffraction efficiencies may depend on sub-pixel fill factors and relative positions between sub-pixels within a single pitch. In additional implementations, an orientation of a display panel's pitch (e.g., the periodic structure) may be rotated to minimize diffraction efficiencies. For instance, a periodic structure along one or more axes (e.g., an X-axis, a Y-axis) may be avoided.

Figure 7:
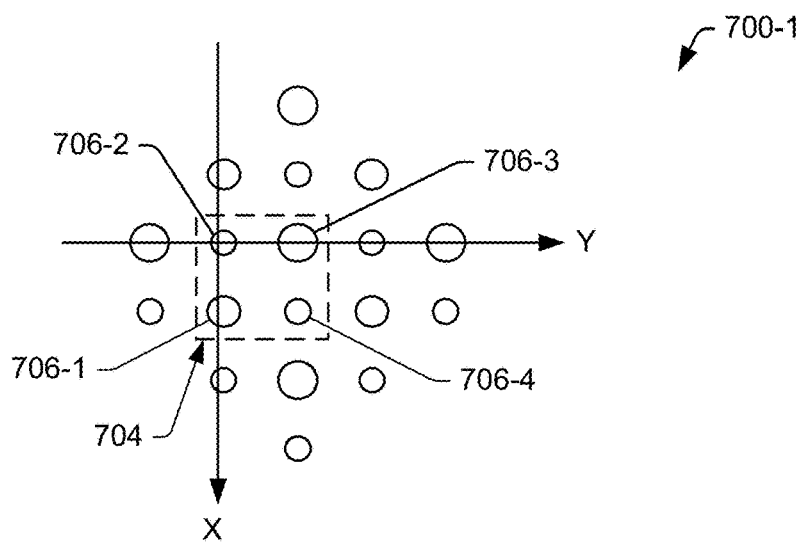
FIG. 7 illustrates a first example implementation and a second example implementation, in a first detail view and a second detail view, respectively, of a first display panel optimized to mitigate display diffraction flares in under-display light-sensing data in accordance with one or more implementations.
Figure 7:
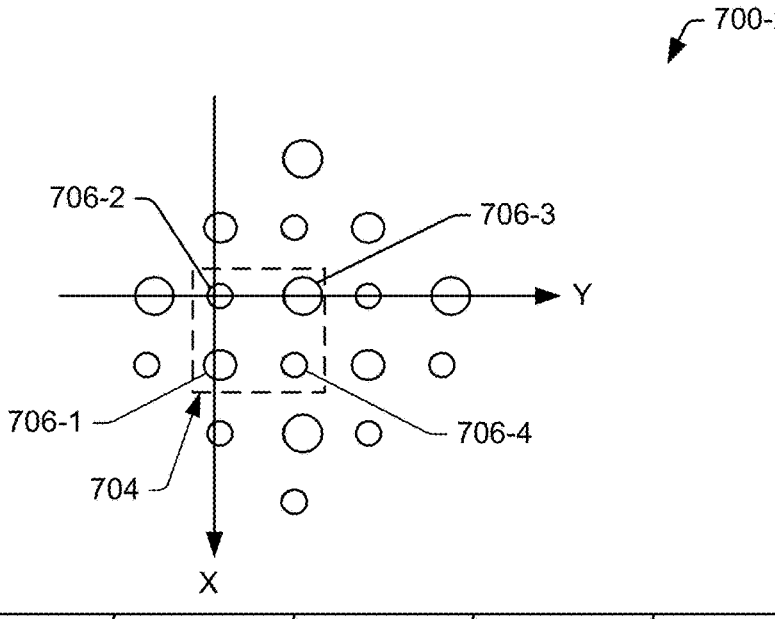

FIG. 7 illustrates a first example implementation 700-1 and a second example implementation 700-2, in a first detail view 702-1 and a second detail view 702-2, respectively, of a first display panel optimized to mitigate display diffraction flares in under-display light-sensing data in accordance with one or more implementations. In this example implementation 700, the first display panel may include a pixel per inch (ppi) of 400 and a 90-micrometer pitch 704. As illustrated, the first display panel of the first example implementation 700-1, which may be unoptimized, includes an arrangement of sub-pixels 706 that may result in calculated diffraction efficiencies (e.g., using the image intensity point-spread-function) of 0.044%, 0.14%, 1.595%, 0.0097%, and 0.91% for diffraction orders (1,0), (1,1), (2,0), (2,1), and (2,2), respectively. In order to reduce all diffraction efficiencies (e.g., flare ratios) below 1%, a placement of sub-pixel 706-3 may be adjusted. For instance, with a constraint of a distance along the Y-axis for sub-pixel 706-3 being between 20 micrometers and 70 micrometers, a minimized diffraction efficiency for diffraction order (2,0) may be calculated using Equation 1 and result in a diffraction efficiency of 0.0082% with a distance of 61.36 micrometers. Thus, the placement of sub-pixel 706-3, within one or more periodic structures (e.g., pitch 704), may be adjusted to 61.36 micrometers (e.g., along the Y-axis) but the placement along an X-axis may remain the same. As illustrated, in the second detail view

702-2, all diffraction efficiencies may be reduced below 1% in such an arrangement, and, as a result, an intensity and/or a prevalence of optical artifacts in light-sensing data may be mitigated.

Figure 8:
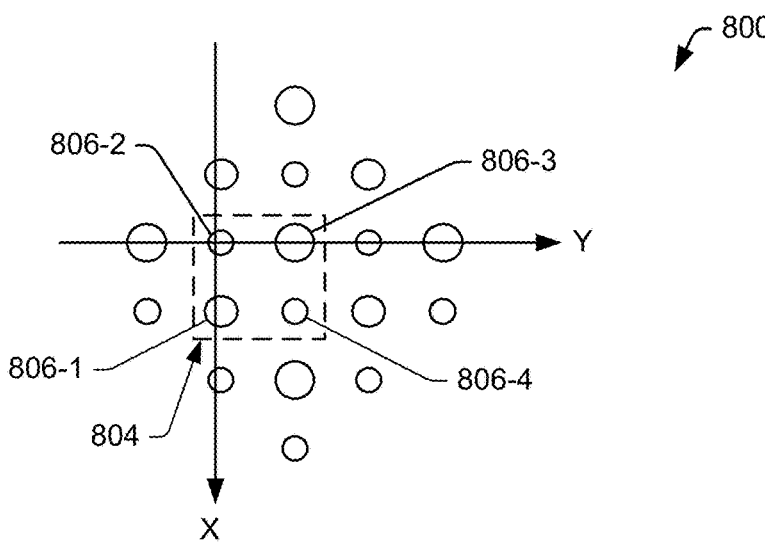
FIG. 8 illustrates a first example implementation and a second example implementation, in a first detail view and a second detail view, respectively, of a second display panel optimized to mitigate display diffraction flares in under-display light-sensing data in accordance with one or more implementations.
Figure 8:
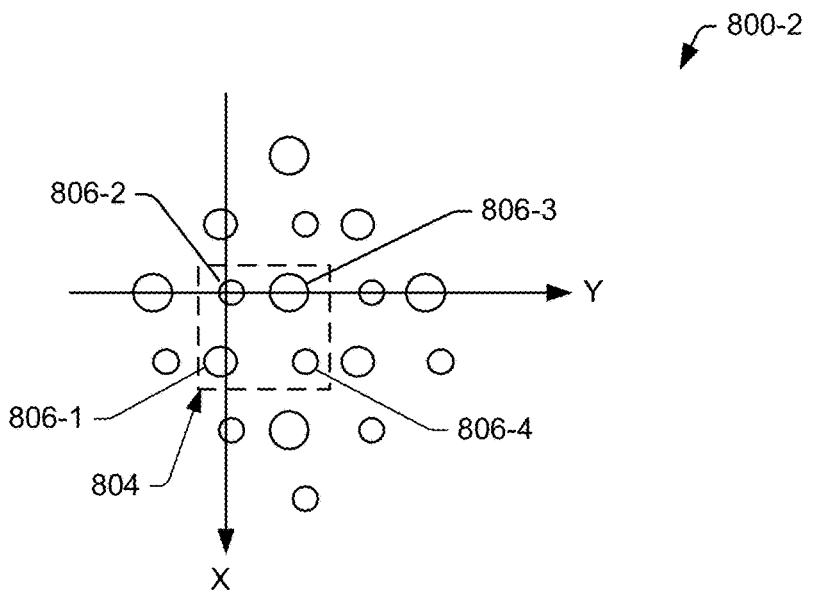

FIG. 8 illustrates a first example implementation 800-1 and a second example implementation 800-2, in a first detail view 802-1 and a second detail view 802-2, respectively, of a second display panel optimized to mitigate display diffraction flares in under-display light-sensing data in accordance with one or more implementations. In this example implementation 800, the second display panel may include a ppi of 512 and a 70-micrometer pitch 804. As illustrated, the second display panel of the first example implementation 800-1, which may be unoptimized, includes an arrangement of sub-pixels 806 that may result in calculated (and near-actual) diffraction efficiencies of 0.069%, 0.4%, 3.5%, 0.01%, and 1.2% for diffraction orders (1,0), (1,1), (2,0), (2,1), and (2,2), respectively. In order to reduce one or more diffraction efficiencies (e.g., flare ratios) and thereby mitigate diffraction flares in under-display light-sensing data, a placement of one or more sub-pixels may be adjusted based on calculated diffraction efficiencies. For instance, with a constraint of a distance along the Y-axis for sub-pixel 806-3 being between 20 micrometers and 80 micrometers, a minimized diffraction efficiency for diffraction order (2,0) may be calculated using Equation 1. Additionally, to further minimize diffraction efficiencies for one or more diffraction orders, a placement of sub-pixel 806-1 may also be adjusted based on calculations using Equation 1. In one example, a placement along a Y-axis of sub-pixel 806-3 may be adjusted to 27.5 micrometers, which may be a displacement of 7.5 micrometers from an unoptimized position. Sub-pixel 806-1 may also be displaced (e.g., along the Y-axis) at a position of 7.5 micrometers from an unoptimized position. Such an arrangement of sub-pixels 806 within one or more periodic structures (e.g., one or more pitches) may result in a diffraction efficiency of 2.0%. As illustrated, in the second detail view 802-2, all diffraction efficiencies may be reduced, though not all may be reduced below 1%. In such an arrangement, even though some diffraction efficiencies may be greater than 1%, an intensity and/or a prevalence of optical artifacts in light-sensing data may be mitigated. For instance, the display of detail view 802-2 may have a total diffraction efficiency of 3.4%, while the display of detail view 802-1 may have a total diffraction efficiency of 5.2% for diffraction orders (1,0) through (2,2). In at least some implementations, to further reduce one or more diffraction efficiencies, a pitch and/or a display panel may be rotated clockwise or counter-clockwise.

Example Method

Example method 900 is described with reference to FIGS. 3-8 in accordance with one or more aspects of mitigating display diffraction flares for under-display sensing. This method is shown as sets of blocks that specify operations performed but are not necessarily limited to the order or combinations shown for performing the operations by the respective blocks. For example, any number of the described method blocks can be skipped or combined in any order to implement a method or an alternate method.

FIG. 9 illustrates an example method 900 directed at mitigating display diffraction flares for under-display sensing in accordance with one or more implementations. At block 902, a lens focal length for an under-display light-sensing device is received (e.g., measured). Such an under-display light-sensing device may include, but is not limited to, an under-display camera (e.g., an under-display fingerprint sensing device, a facial recognition camera), an ambient light sensor, a depth-sensing device, and so on.

At block 904, based on a derived image intensity point-spread-function equation adjusted for the received lens focal length, a physical arrangement of components within a display panel may be determined so as to reduce a diffraction efficiency for one or more diffraction orders. For instance, the diffraction efficiency may be reduced (or may be desired to be reduced) below 1%. In further implementations, the image intensity point-spread-function equation may be adjusted for sub-pixel fill factors, relative positions between sub-pixels, and a display panel's pitch.

At block 906, components within the display may be arranged based on the determined physical arrangement of components within the display panel so as to mitigate diffraction flares (e.g., a diffraction phenomenon) at an image plane of the under-display light-sensing device.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying Drawings and terms discussed herein may be indicative of one or more items or terms, and thus reference may be made interchangeably to single or plural forms of the items and terms in this written description.

Although implementations directed at mitigating display diffraction flares for under-display sensing have been described in language specific to certain features and/or methods, the subject of the appended Claims is not necessarily limited to the specific features or methods described. Rather, the specific features and methods are disclosed as example implementations directed at mitigating display diffraction flares for under-display sensing.

What is claimed is:

1. A computing device comprising:
   a display, the display having a display panel, the display panel having multiple components, the components comprising:
      pixel circuits;
      sub-pixels; and
      routing circuitry; and
   an under-display light-sensing device having a lens focal length,
   two or more of the components of the display panel having a physical arrangement within the display panel, the physical arrangement within the display panel arranged based on the lens focal length, the physical arrangement effective to mitigate diffraction flares at an image plane of the under-display light-sensing device.

2. The computing device of claim 1, wherein the physical arrangement within the display panel is based on a derived image intensity point-spread-function equation that is adjusted for the lens focal length.

3. The computing device of claim 2, wherein the derived image intensity point-spread-function equation is further adjusted for one or more fill factors of the display panel, the one or more fill factors based on a ratio of a size of an emissive area of one or more of the sub pixels and a total area of the one or more of the sub-pixels.

4. The computing device of claim 1, wherein the two or more components include two or more sub-pixels.

5. The computing device of claim 4, wherein the two or more sub-pixels are arranged to mitigate the diffraction flares caused by ambient light.

6. The computing device of claim 4, wherein the two or more sub-pixels are arranged in a periodic pattern based on a panel pitch of the display panel of the display.

7. The computing device of claim 1, wherein the display is an organic light-emitting diode type of display.

8. The computing device of claim 1, wherein the display further comprises a cover layer.

9. The computing device of claim 1, where the physical arrangement within the display panel is based on a size of the two or more components.

10. The computing device of claim 9, wherein the two or more components include one or more of the pixel circuits and a portion of the routing circuitry.

11. The computing device of claim 1, where the physical arrangement within the display panel is based on a diffraction efficiency for a diffraction order, the diffraction efficiency effective to mitigate intensity at the under-display light-sensing device.

12. The computing device of claim 1, wherein the computing device further comprises an authentication manager, and wherein the under-display light-sensing device provides data to the authentication manager.

13. One or more non-transitory computer-readable storage media having instructions stored thereon that, responsive to execution by one or more processors, perform operations comprising:
   receiving a lens focal length for an under-display light-sensing device;
   determining, based on a derived image intensity point-spread-function equation adjusted for the lens focal length, a physical arrangement of components within a display panel effective to reduce a diffraction efficiency for one or more diffraction orders; and
   arranging the components within the display panel based on the determined physical arrangement of components within the display panel effective to mitigate diffraction flares at an image plane of the under-display light-sensing device.

14. The non-transitory computer-readable storage media of claim 13, further comprising an operation of receiving one or more fill factors for the display panel, the one or more fill factors defined as a ratio of a size of an emissive area of a sub-pixel and a total area of the sub-pixel, and wherein the derived image intensity point-spread-function equation is adjusted for the one or more fill factors.

15. The non-transitory computer-readable storage media of claim 13, wherein the determining of the physical arrangement of components within the display panel further comprises determining a spacing between the components within the display panel along a single plane.

16. The non-transitory computer-readable storage media of claim 15, wherein the single plane is parallel with the image plane of the under-display light-sensing device.

17. The non-transitory computer-readable storage media of claim 13, wherein the components within the display panel comprise sub-pixels, and wherein the arranging of components within the display panel based on the determined physical arrangement of components arranges sub-pixels within the display panel effective to mitigate diffraction flares at the image plane of the under-display light-sensing device.

18. The non-transitory computer-readable storage media of claim 13, wherein the determining of the physical arrangement of components within the display panel is further effective to reduce an overall sum of diffraction efficiencies for a lowest five diffraction orders.

19. The non-transitory computer-readable storage media of claim 13, further comprising an operation of receiving a display panel pitch and wherein the derived image intensity point-spread-function equation is adjusted for the display panel pitch.

20. The non-transitory computer-readable storage media of claim 13, further comprising an operation of determining at least one of a physical shape or size of one or more of the components within the display panel, and wherein arranging the components within the display panel is further based on at least one of the determined physical shape or size of the one or more components.

* * * * *